Patented Mar. 29, 1927.

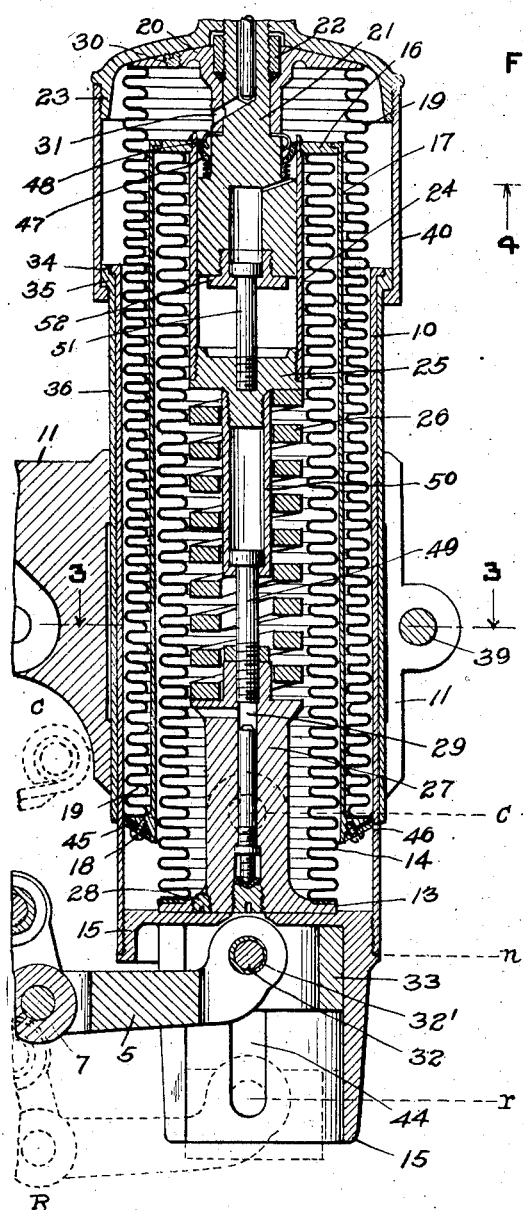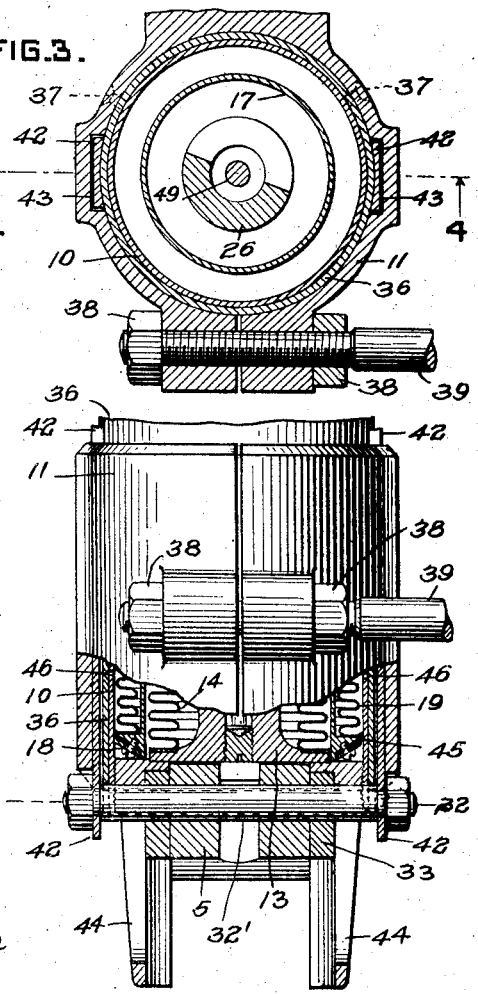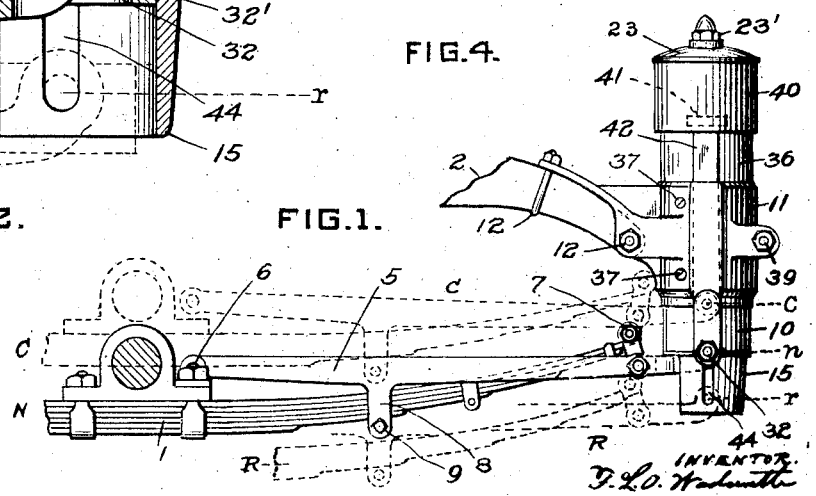

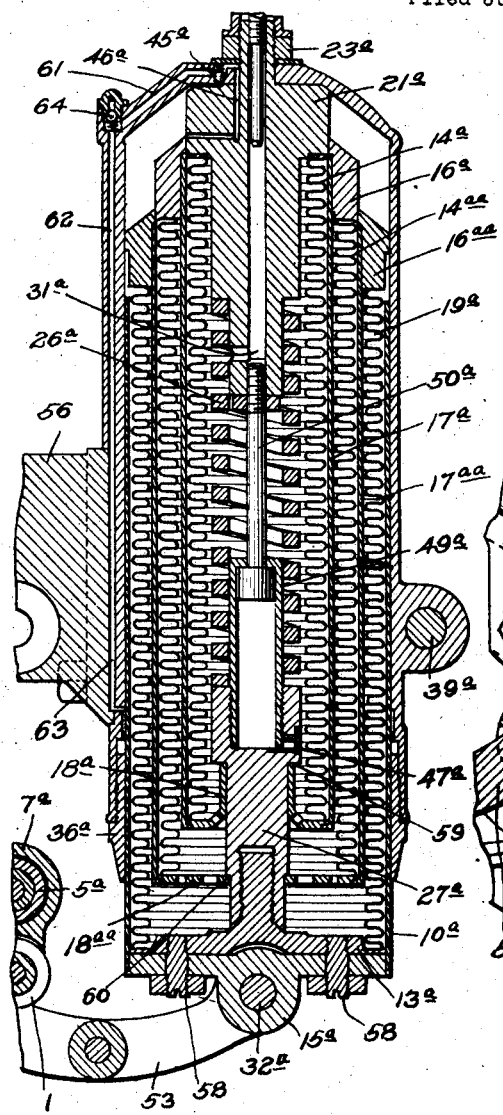

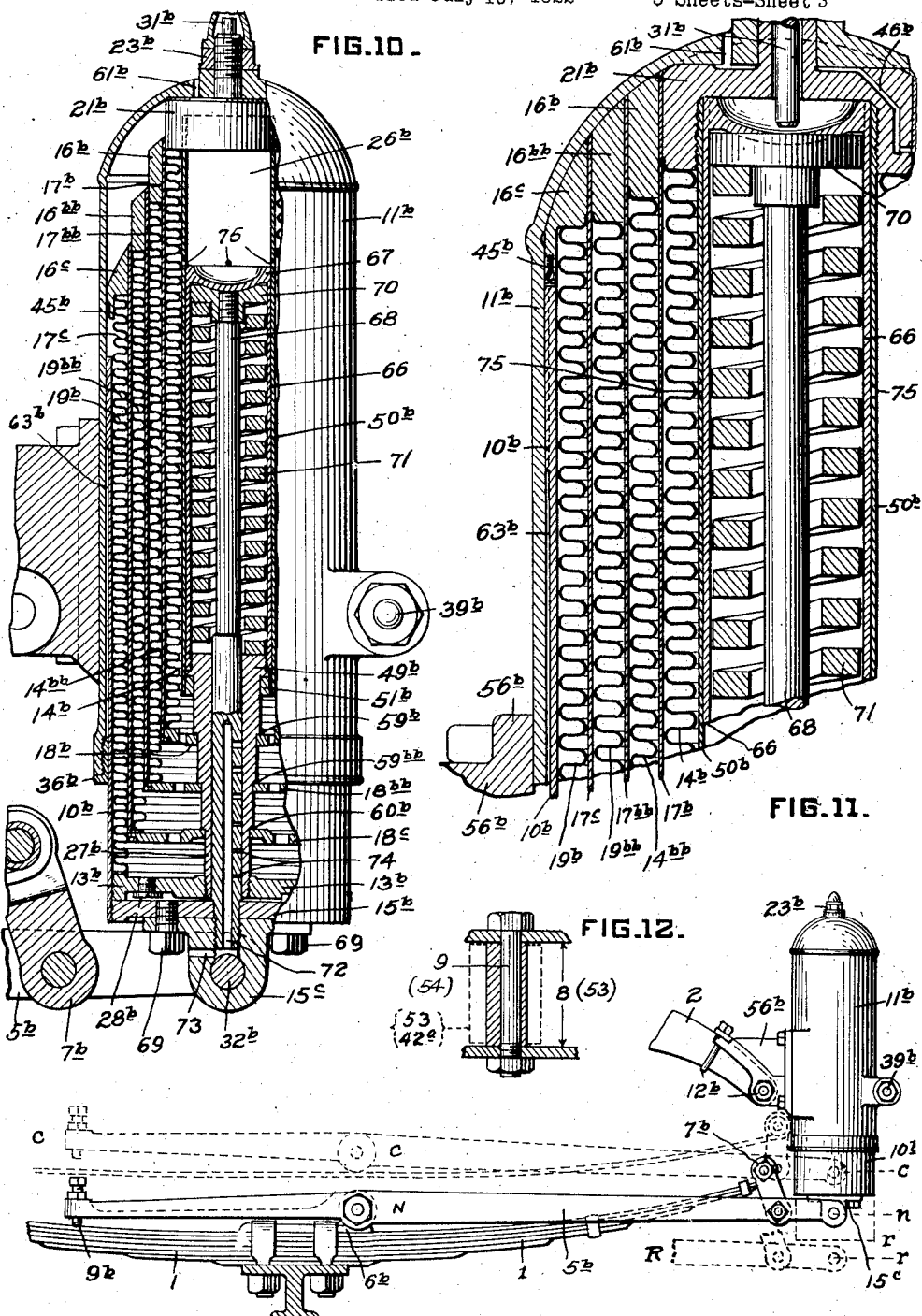

1,622,892

UNITED STATES PATENT OFFICE.

FRANK L. O. WADSWORTH, OF PITTSBURGH, PENNSYLVANIA.

ELASTIC SUSPENSION SYSTEM FOR VEHICLES.

Application filed July 10, 1922. Serial No. 573,832.

My invention relates to that type of elastic suspension systems in which supplemental cushioning devices are interposed between the ends of the ordinary suspension springs and those parts of the vehicle frame or chassis to which the said ends are ordinarily attached either by shackles or pintle bolts; and the generic purpose of these improvements is to greatly increase the shock absorbing capacity of the spring system and render the latter capable of effectively cushioning and absorbing the effect of both the minor vibrations and of the major shocks that are imposed on the wheel and axle members under the widely varying conditions of road travel;—thus protecting the body of the vehicle and the occupants thereof against the objectionable oscillations and jars to which they are subjected by the action of the usual form of leaf spring supports.

Another general object of these improvements is to provide a spring suspension system which will act efficiently in elastically resisting and checking, not only the compression of the system, but also the rebound or upthrow that follows such compressive movements;—thus eliminating or greatly abating the disagreeable and sometimes dangerous "tossing" and "pitching" which result from an unrestrained recoil or expansion of the stressed suspension elements.

A further purpose of this invention is to provide a form of connection or coupling between the main spring element of the system and those parts of the vehicle to which this primary suspension member is ordinarily attached, which will prevent, or eliminate, any reflex movement, or negative flexure, of the main spring when the body and axle parts separate, or expand, beyond the normal load position; and which will thus avoid or greatly diminish, the danger of permanently distorting or completely rupturing the said primary suspension member by an excessive or supernormal rebound stress.

Still another object of the present improvements is to provide a control and actuating mechanism for the supplemental cushioning device which will prevent the recoil or expansion of the elastic elements thereof beyond the initially tensioned form assumed by them under normal or static load conditions, but which will also enable said elastic elements to be progressively and increasingly flexed by movements of the spring suspended parts in either direction from the position of static equilibrium. An accompanying feature of this provision is the production of a very compact form of supplemental suspension spring, which has a very wide range of action in restraining both the abnormal approach or the supernormal separation of the body and axle members of the vehicle chassis.

A more specific feature of this invention is to provide a form of fluid pressure suspension element, or a pneumatic spring shackle support, that comprises a volumetrically elastic, but permanently sealed fluid retaining cell or chamber of metal or other equivalent material which is not detrimentally affected by the action of heat or oil, and which is not dependent upon the action of any packing or of any mechanical pump for preventing or compensating for the leakage of the compressed fluid therefrom.

Another specific object of my improvements is to provide a simple form of highly elastic or flexible container which is capable of a relatively large volumetric contraction and expansion with a relatively small distortion of any part of the containing walls; and which will therefore be capable of long continued use under severe conditions of vibration and oscillation without any undue straining, or crystallization, or other detrimental change, in the metal or other material of which these walls may be composed.

Other novel features of construction and operation—which may not be specifically pointed out in the preceding statements of invention—will be made apparent, to those skilled in this art, by the following description of certain exemplary embodiments of my improvements, that are illustrated in the accompanying drawings, in which:

Fig. 1 is a general side view of one form of my improved suspension system as applied to one of the main side leaf springs of a vehicle; Fig. 2 is an enlarged longitudinal section of one form of the supplemental spring elements that may be used as a part of the construction shown in Fig. 1; Fig. 3 is a cross section on the plane 3—3 of Fig. 2; Fig. 4 is a partial sectional elevation, on the plane 4—4 of Fig. 3, with the parts in the position which they assume under an increased load stress; Fig. 5 is another side view of a second illustrative embodiment of my present improvements; Fig. 6 is a similar view of a portion of this same construction with the parts in the position of extreme rebound; Fig. 7 is an enlarged longitudinal section, similar to that of Fig. 2, of another form of fluid cell construction that may be used in this exemplification of the invention; Fig. 8 is an elevation, partially in section, of the construction shown in Fig. 7, but with the parts in the position of extreme compression; Fig. 9 is still another general side view of a third embodiment of my present invention; Fig. 10 is a longitudinal section, similar to those of Figs. 2 and 7, of the fluid suspension member of this last construction; Fig. 11 is a partial longitudinal section of the said member with the parts thereof in the position which they occupy when subjected to abnormal kinetic load; and Fig. 12 is a detail view of an eccentric collar adjustment that may be used with any one of the exemplary forms of construction herein shown and described.

In the organization shown in Fig. 1 the inner end of the main side leaf spring 1 is flexibly coupled to the body of the vehicle in the usual manner; and the outer end of this primary suspension member is operatively conjoined to the projecting horn 2 of the body sill by means of my supplemental suspension mechanism. This comprises a forked lever 5 which is pivotally mounted, at one end, on the axle bracket 6; is flexibly coupled at an intermediate point of its length with the eye end of the main spring 1, by means of the solid U shaped shackle link 7; and is operatively connected, at its outer extremity, to a suitable supplemental spring support on the body of the vehicle. The central portion of the lever is provided with a pair of depending ears 8 that extend downward, one on each side of the main leaf spring 1, and are connected at the bottom by a cross bolt 9, on which is mounted an eccentric collar that can be clamped in any desired position between the ears 8, 8, (as shown in detail in Fig. 12) and is preferably so adjusted as to make contact engagement with the under side of the primary suspension spring when the parts of the system are in the normal full line positions, N—n, of static equilibrium. The secondary spring support that carries the front end of the lever 5 may be of any appropriate form; as here shown it consists of an elastically controlled plunger 10 which is slidably mounted in a bracket 11 that is rigidly secured to the body horn 2 by means of the pintle and stirrup bolts 12—12.

When this organization is subjected to a kinetic compression stress, and the body and axle members 2 and 6 are forced toward each other (from the full line positions N—n toward the upper dotted line positions C—C—c of Fig. 1) the plunger 10 is raised against the supplemental spring pressure which supports and balances the normal load on the end of the body horn 2. The concurrent increase in the stress on the outer ends of the relatively rigid lever 5 and the relatively flexible main spring 1 rocks these pivotally connected elements in a clockwise direction (with respect to their axle supports), and carries the eccentric collar on the bolt 9 away from its engagement with the lower leaf of the primary suspension member; thus permitting the latter to be positively flexed and straightened out to any required degree as the load and compression strain on the system is progressively increased. But when the parts have again returned to the normal load position N, and are subjected to a rebound or expansion stress—that tends to carry them from the full line positions of Fig. 1 toward the lower dotted line positions R—R—r of that figure—the engagement of the eccentric collar stop on the bolt 9 with the main spring 1 prevents any relative counter-clockwise movement of these members on their axle supports; and compels the inter-engaged and interlocked elements 1—5—6—7—8—9 and 10 to move downward (or away from the body) as a rigid unit, without permitting any recoil, or negative flexure of the primary suspension spring 1. This expansion movement is resisted by the action of gravity, which may be assisted, if desired, by a suitable restraint on the downward movement of the spring controlled plunger 10 in its body support 11. The supplemental lever-stop-spring suspension mechanism just described therefore permits the main leaf spring to flex freely in one direction—under an increased compression stress—but prevents it from reflexing beyond the form that it assumes under normal load.

The lever element 5 also acts as a radius arm which maintains the axle member at a fixed distance from the rigid bracket support 11, on the front horn of the vehicle body, and thus prevents any "fore and aft" pitching of the spring suspended parts; while the transverse rigidity of the guide elements 10 and 11 and the lateral stiffness of the broad U-shaped link 7 and the double arm lever elements 5—8 and 9—which closely embrace and support both the intermediate portion and the outer end of the main spring 1—strongly resist any side sway or transverse displacement of the elastically connected body and axle parts.

The plunger 10 may be elastically supported in the bracket 11 by any suitable form of resilient suspension elements—such, for example, as either single-acting or double-acting helical coil springs interposed between the ends of the relatively movable parts 10 and 11—but in order to attain a high degree of sensitiveness, as well as a wide range, in the cushioning and shock absorbing action, I prefer to employ, for this purpose, some form of fluid pressure cell, the elastic resistance of which, can be readily varied as required by altering the quantity of fluid in the pressure chamber. The form of cell construction which is shown in Figs. 2 and 3 (as adapted for use in the organization of Fig. 1) comprises a flexible corrugated metal tube or bellows 14 which is soldered or otherwise hermetically sealed, at its lower end to a rigid head 13, and which is similarly attached at its upper extremity, to an annular ring or cap 16 on the top of a thin sleeve 17 that surrounds the tube 14 and extends downwardly to a point near the lower end thereof, where it terminates in a flange collar 18. This collar carries a second corrugated metal bellows 19, which is soldered, at its upper end, to a cone shaped head 20 that is sealed, in turn, to a flanged cap bolt 21 by means of a soft metal packing ring and nut 22. The elongated head of the bolt 21 is closely engaged by the upper end of an inner tubular member 24, which is attached to the ring 16; and the lower extremity of this member is hermetically closed by the cap 25. A heavy coil compression spring, 26, is interposed between this cap and the central boss 27 which extends upwardly from the lower head 13. The space enclosed between the head 13, the metal bellows 14, the ring 16, the tubular member 24 and the cap 25 constitutes one fluid pressure cell, which can be filled or emptied through either the screw closed opening 28 or the valve controlled passage way 29 in the lower head. The space between the substantially integral parts 20—21, the metal bellows 19, the collar 18, the sleeve 17 and the ring 16, forms a second pressure cell to which access is obtained through either the plug closed vent 30 or the valve closed duct 31 in the upper head and bolt members 20—21. Each of these cells may be partially filled with oil, or other suitable liquid; and each is charged with compressed air or other appropriate gas until the expansion pressure on the heads 13 and 20—which is due in part to the fluid pressure in the cells and in part to the initial compression that may be imposed on the spring 26—is sufficient to balance the static load stress to which the tensioned spring elements are subjected when they are interposed between the opposing ends of the lever actuated plunger 10 and the body connected casing 11. and the assembled members are supported in the median normal load position of Figs. 1 and 2. It will be noted that the cell ends, 16. 18 and 25, are held in fixed relationship to each other by the longitudinally rigid connectors 17 and 24; and under the conditions just specified the force exerted on the upper movable end wall of the inner cell—which is equal to the fluid pressure therein plus the normal or initial tension imposed on the compression spring 26—is directly transmitted to, and balanced or supported by, the opposing force on the lower movable end wall of the outer cell— this latter force being due to the gaseous pressure in the outer chamber, reinforced to some slight extent by the action of fluid which may leak from the said chamber, past the closely engaged parts 21 and 24, into the space above the cap 25. The two concentric cell elements therefore act on the opposing heads 13—27 and 20—21, as though the said cells were arranged end to end, or in series with each other; and any relative approach movement of the said heads is equitably divided between the two cells and is elastically resisted by the cooperative and concurrent and substantially equal compression of both of them. The expansive and contractive motion of each of the corrugated metal walls 14 and 19 is thus reduced to one-half of what it would be if a single flexible bellows was used to provide for the same change in the volumetric capacity of the fluid retainer.

The opposing heads 13 and 20 of the fluid pressure spring may be directly attached, the one to the axle supported lever 5, and the other to the body supported casing 11; and in such case the relative movements of the said heads are the same, in direction and amount, as the accompanying movements of the body horn 2 and the adjacent end of the main spring 1. But I prefer to construct and arrange the relatively movable parts of my suspension system in such manner that the heads 13 and 20 are drawn toward each other—with a resultant compression of the supplemental spring elements—by a movement of the body and axle parts in either direction from the normal load position. This one way movement of the secondary spring element—for a two way movement of the spring suspended chassis parts—further reduces the maximum distortion of the flexible walls of the series connected pressure cells; and also makes it possible to utilize the elastic resistance of these cells in restraining both the compression and the rebound or expansion of the suspension system.

The dual functional action last described may be produced by various forms of construction. In the one illustrated in Figs. 1, 2 and 3, the lever 5 is pivotally connected, by the bolt, 32 and bushing element 32', to a segmental ring 33 that is adapted to slide longitudinally in the lower head 15 of the plunger tube 10; and the upper end of the plunger tube, is provided with an outwardly turned flange 34 that is adapted to engage with the adjacent flanged extremity 35 of the casing sleeve 36—(which is rigidly secured in the bracket 11 by means of the screws 37—37 and the nuts 38—38 on the cross-tie-rod 39)—and thus limit the downward movement of said plunger, and its head, with respect to the body supported bracket 11. The lower head 13 of the fluid spring rests on the upper surface of the plunger head 15; and the upper head 20 of this spring is secured to a cap 23, by means of a nut 23' on the upper end of the bolt 21. The cap 23 is operatively connected to the bracket 11 by a short tube 40 which is provided with a shouldered end that is adapted to engage the reversely turned flange 35, of the casing sleeve 36, and thus limit the upward movement of the parts 23—20 with respect to the body members. The flange 35 is cut away, at two diametrically opposite points in its periphery, to receive the T-shaped heads 41 of a pair of connecting straps 42—42, that extend downwardly through suitable guide openings, 43, in the sides of the bracket 11, and are perforated at their lower extremities to receive the ends of the pivot connections 32—32', which project out through slots 44 in the sides of the lower head 15. The operation of this construction is as follows: When the parts are moved from the full line positions N—n of Figs. 1 and 2 toward the positions shown in Fig. 4 (or the dotted line positions C—C—c of Figs. 1 and 2)—as by the action of a compressive shock—the auxiliary head 33 engages with the head 15 and lifts the latter toward the cap 23 which is now held in fixed position with respect to the bracket 11 by the engagement of the shoulder on the tube 40 with the flanged head 35 of the casing sleeve 36. This movement also lifts the connecting straps 42; but this action merely carries the T-shaped heads 41 of the straps up out of engagement with the shouldered end of the tube 40 and has no functional effect. But when the body and axle parts separate or expand beyond normal load position (N)—and move toward the lower dotted line positions R—R—r of Figs. 1 and 2—the T-shaped heads 41 engage with the inwardly turned shoulder on the cap tube 40, and the downward movement of the lever 5 and its pivot bolt 32 then draws the said tube and its attached head 23 toward the lower head 15:—the latter being now prevented from following the movement of the lever and the auxiliary guide head 33 by the engagement of the flange 34 on the plunger tube 10 with the flange 35 on the casing sleeve 36. In order to eliminate any lost motion between the successively engaged parts 33—15 and 40—41, suitable provision is made for the adjustment of the ends of the pivot bolt 32 with respect to the connecting straps 42. In the form of construction shown this adjustment can be effected by rotating the bushing or sleeve 32'—which has a pivotal bearing in the members 5 and 33—and clamping it in the desired position between the ends of the said straps by means of the nuts on the ends of the said bolt (in the same manner in which the eccentric collar on the bolt 9 is clamped between the ears 8—8, Fig. 12).

The relative approach of the two heads 15 and 23—whether produced by a compressive movement or by a rebound movement of the suspension system as a whole—is accompanied by a corresponding approach of the spring heads 13 and 20, and this motion is elastically restrained by the progressively increased compression of the two series connected pressure cells (or by any other form of supplemental cushioning spring that may be interposed between the said heads) until the cell ends 16 and 18 have been brought into engagement, respectively, with the heads 20 and 15; and the various parts are preferably so proportioned that this limit of supplemental spring compression is reached concurrently with the engagement of the pivot bushing 32', either with the lower extremity of the casing sleeve 36 (as shown in Fig. 4), or with the lower ends of the slots 44 (as shown in the lower dotted lines R—r of Fig. 2). A continued approach movement of the body and axle parts (after the first mentioned engagement) is permitted, but is very effectively resisted and rapidly checked, by a further positive bending, and straightening out, of the already strongly flexed main leaf spring 1. But in the case of rebound or expansion movements the primary suspension member is locked against any reflex or negative bending (by the interengagement of the relatively rigid lever-stop elements and connections, 5—6—7—8—9); and when the separation of the vertically oscillating chassis parts is sufficient to bring the lever connections 32—32' into contact with the bottom of the slots 44, any further expansion of the system is very quickly arrested by the resistance of the relatively stiff lever member 5 to edgewise flexure.

My invention may, in some cases, also include means for damping or slowing the recoil or return of the spring elements from their abnormally stressed and flexed condition to the position of static equilibrium. In the exemplification shown in Figs. 2 and 4 this damping effect is secured by providing the collar 18 with a flexible packing or "wiper" ring, 45, which engages with the inner surface of the plunger tube 10, and which is of such form as will permit the air below the collar to escape freely to the space above it—when the parts move toward the position of Fig. 4—but will prevent any reverse flow of fluid when the parts return to normal load position. The recoil of the compressed elements is therefore retarded by the creation of a partial vacuum on the under side of the collars or rings 18 and 16; and this retarding effect is progressively augmented as the recoil movement proceeds, until the return of the parts to the normal load position of Fig. 2 permits air to enter the space below the rings 18—45 through a row of small vents 46 (which also serve to indicate the correct relative location of the mutually reciprocating plunger and cell members when they are in the said normal load position). A similar and cooperative damping effect on recoil movements may be obtained by providing the bearing between the tubular member 24 and the head of the bolt 21 with a wiper ring 47, which is held in close pressure engagement with the surface of the tubular member by a spring expander ring 48. When the inner cell is compressed to its maximum amount the cap 25 is brought into close proximity to the end of the member 21, and substantially all of the fluid which may have leaked into this space, from the outer cell chamber, is driven back into that chamber, past the outwardly yielding wiper ring 47. When the recoil movement occurs the pressure in the expanding space above the cap 25 is greatly reduced and the return of the parts to normal load position is correspondingly retarded. The recurrent reciprocation of the engaged parts 21 and 24 also serves to prevent any accumulation of fluid pressure on the upper face of the cap 25, and correspondingly increases the supporting effect of the cooperative spring forces that are acting on the movable end walls 16—25 of the inner cell.

The air which is driven upwardly into the annular chamber above the wiper ring 45, and is further compressed in that chamber by approach movements of the plunger tube 10 and the cap 23, will be, in part, expelled through the vent openings 46 into the bearing space between the plunger 10 and the casing sleeve 36 (see Fig. 4); and will serve to blow dust and grit out of the lower end of this bearing. If in the course of long continued operation either the tube 10 or the sleeve 336 becomes unduly worn, one or both of these members can be very easily removed and a new part or parts substituted therefor.

The supplemental spring elements of the above described combination can also be easily detached as a unit from the rest of the organization by supporting the weight of the body member 2 on a suitable jack and then removing the lock nut 23′ and the cap 23; after which the entire spring assembly may be lifted away from its support on the plunger head 15, and replaced, if desired, by another duplicate assembly. In order that these operations may be carried on with fully charged and pretensioned cells I provide suitable stop elements which limit the expansion of the spring parts by the internal pressures. In the illustrative form of construction now under consideration the limit stop for the inner cell consists of a cap bolt 49 which is screwed into the end of the lower head extension 27 and which is engaged by the flanged end of a tubular extension 50 on the cap 25. The expansion of the outer cell is correspondingly limited by a cap bolt 51 that is screwed into the cap 25 and is engaged by a flange bushing 52 at the lower end of the bolt 21. In the initial assembly of the spring elements the bolt 49 is so adjusted that the maximum allowable separation between the heads 13 and 20 is slightly greater than the normal distance between the plunger and casing heads 15 and 23; and the spring cells are charged with fluid until the desired load carrying capacity is attained; after which the valves in the passages 29 and 31 may be permanently sealed. By preparing and keeping in stock a number of these charged cells of varying elastic resistance it becomes possible to easily replace or renew leaky or defective air spring elements of different suspension organizations; or to quickly change these elements, when desired, to most effectively deal with varied conditions of load and of road surface. The entire absence of any sliding joints through which the confined fluid may leak to the exterior of the spring eliminates any necessity for recharging or renewal, or any other inspection service, unless one of the flexible walls of the air cell becomes ruptured—or one of the permanent seals at the ends of the said cell is impaired—by the effects of long continued vibration and oscillation. But the possibility of such injury is reduced to a minimum by the use of the multiple-series-connected bellows structure—which greatly increase the effective length of the longitudinally flexible side walls of the cell and thus greatly diminishes the maximum contractive and expansive movements of the individual folds of those walls—and by the employment of double acting limit stop connections between the main and supplemental air spring members of the combination, which prevents any expansion of the air cell elements beyond their initial normal load form and volume, and reduces the maximum compression thereof to substantially less than one-half of the concurrent relative oscillations of the spring supported body and axle members. The possible life of a corrugated metal bellows—when subjected to repeated contractive and expansive movements—increases very rapidly when the bending or distortion of the individual corrugations thereof is decreased; and both of the last specified features of my present invention (which mutually contribute to the diminution and minimization of the said distortion) are therefore of particular importance in conjunction with the use of permanently sealed fluid spring elements such as have been heretofore described.

The construction depicted in Figs. 5, 6, 7 and 8 presents the same general features of structure and of operation as are characteristic of the previously illustrated form of my invention; but this second exemplification of my improvements differs from the first in various details of construction. In the arrangement shown in Fig. 5 the lever element 5ª is rotatably mounted, near its inner end, on the axle block 6ª, and is coupled, at its outer extremity, to the end of the main spring 1 by means of the hooded shackle link 7ª. This lever is not directly connected to the plunger element 10ª of the supplemental spring member, but is operatively conjoined therewith by means of the auxiliary twin-arm link bar 53, which is coupled, at its opposite ends, to the lower end of the said plunger (by the pintle bolt 32ª) and to an upwardly projecting boss on the median portion of the lever 10ª (by means of the pintle bolt 54), and which is also coupled near its center, to the body horn 2 of the vehicle, by means of the "one way" adjustable strap connection 42ª. The inner end of the lever 5ª projects beyond the axle and axle block 6ª, and is provided at its extremity with an adjustable screw 9ª that is adapted to be engaged by a coned recess in the top of the block 55, when the parts are in the full line normal load position N, as shown in Figs. 5 and 7.

The operation of this portion of the suspension system is as follows: When the spring suspended parts are subjected to kinetic compression stresses the upper edge of the lever 5ª engages with a cross web between the arms of the link 53—or with the adjacent lower end of the flexible strap connection 42ª; and the relative approach of the body and axle-main-spring members raises the interengaged lever-link elements 5ª—53, as a unit, and correspondingly lifts the plunger 10ª against whatever supplemental spring resistance may be provided for the restraint of such movement. This compressive movement is accompanied by the usual increased flexure of the main spring 1; and the resultant flattening and straightening out of the primary suspension member results in a slight clockwise rotation of the connected lever-link elements 5ª—53 on the main pivotal support 6ª therefor, and thereby carries the stop screw 9ª out of engagement with the recess in the axle block 55 (as shown in dotted lines in Fig. 5). When the system is expanded beyond normal load position the screw 9ª engages with its axle support and thereby prevents the main spring from reflexing or recoiling beyond its normally flexed form. The interlocked leaf spring, lever and axle elements, 1—5ª—6ª—7ª—9ª—55, then move downward, or away from the body, as a rigid unit; but the pull of the strap connection 42ª on the link bar 53, rocks the latter in a counter-clockwise direction on its downwardly moving lever support 54; and thus moves the plunger 10ª of the supplemental spring member in the same direction as it is moved by the compression of the system. The relative positions then assumed by the lever 5ª, the link 53 and the secondary spring supports, are shown in Fig. 6; and a comparison of this figure with the dotted line indications of Fig. 5 (which outline the parts in the position of extreme compression) makes it apparent that the supplemental spring elements of this combination will always be moved and flexed in the one direction—i. e., upward with respect to the body supported member 11ª—whenever the other parts of the suspension system are displaced in either direction from the normal load position, N, of static equilibrium. It will also be apparent that the conjoined lever and link elements 5ª—53 act as a longitudinally rigid radius rod that will serve to maintain a substantially unchanged distance between the axle supported bracket 6ª and the body supported plunger and casing members 10ª—11ª; and that the multiple point overlapped engagement between the sides of the double arm U shaped link bar 53 and the adjacent edges and faces of the parts 1, 5ª and 7ª gives to this radius arm connection a high degree of transverse stability and rigidity that will effectively prevent any side sway, or any relative lateral displacement, of the vertically oscillating parts.

The plunger support 11ª may be constructed, and connected to the body horn 2, in any suitable manner; and the upward movement of the plunger 10ª, in the said support, may be elastically resisted by any appropriate type of single acting spring construction. As illustrated in Figs. 7 and 8 the sides and cap of the member 11ª are cast in one integral piece, which is bored and lapped to form a good bearing for the upper end of the straight plunger tube 10ª, and which is preferably recessed and threaded, at its lower end, to receive a packing ring and a renewable casing sleeve 36ª that supports and guides the adjacent portion of the said plunger. This support is provided at one side with a boss to receive the end of the cross tie rod 39ª and is recessed and surfaced on its opposite side to receive an extension bracket 56 that is secured thereto by the bolts 57, and is clamped to the body horn 2 by means of the bolts 12ª. The lower end of the plunger tube 10ª is brazed or otherwise permanently attached to the cap 15ᵃ that carries the pintle bolt 32ᵃ; and the upper side of this cap is faced off to receive the head 13ᵃ of a fluid pressure supplemental spring element that is detachably secured to the said cap by means of the stud bolts 58. The opposite head 21ᵃ of the supplemental spring is supported by the top cap of the member 11ᵃ and is clamped thereto by the nut 23ᵃ. The heads 13ᵃ and 21ᵃ are elastically united by the three longitudinally flexible metal bellows 14ᵃ, 14ᵃᵃ and 19ᵃ that are connected in series with each other by the longitudinally rigid equalizing sleeves, 17ᵃ and 17ᵃᵃ. The upper ends of these sleeves are attached to radially engaged rings or collars, 16ᵃ and 16ᵃᵃ which are in respective sliding contact with the exterior of the head 21ᵃ and with the internal bore of the support 11ᵃ; and the lower extremities thereof terminate in perforated annular caps 18ᵃ and 18ᵃᵃ which surround the central boss 27ᵃ of the lower head 13ᵃ, and are limited in their upward movement thereon by the shoulders 59 and 60. The boss 27ᵃ is also provided with a hollow cap extension 49ᵃ which is adapted to engage with the head of an adjustable bolt 50ᵃ that is screwed into the upper head 21ᵃ; and which thus serves to limit the relative separation or expansion of the supplemental spring heads 13ᵃ and 21ᵃ. A heavy compression spring 26ᵃ is interposed between the adjacent ends of the members 21ᵃ and 27ᵃ and serves to assist in resisting the approach of these parts.

The space enclosed by the lower head 13ᵃ, the outer bellows 19ᵃ, the transmission sleeve 17ᵃᵃ, the intermediate bellows 14ᵃᵃ, the transmission sleeve 17ᵃ, the inner bellows 14ᵃ and the upper head 21ᵃ, constitutes a single fluid container or pressure cell, which can be charged with the desired quantities of liquid and gas, either through the opening left by removing one of the stud bolts 58 from the lower head, or through the valve controlled passage way 31ᵃ in the upper head. When so charged the expansive pressures acting on the upper ends or heads 16ᵃᵃ and 16ᵃ of the two annular compartments, 19ᵃ—17ᵃᵃ and 14ᵃᵃ—17ᵃ, are successively transmitted through the equalizing sleeves 17ᵃᵃ and 17ᵃ to the perforated lower end plates 18ᵃᵃ and 18ᵃ—(which limit the expansive movement of the flexible walls 19ᵃ and 14ᵃᵃ by the cooperative action of the stop elements 60—59 and 49ᵃ—50ᵃ)—and the supporting effect of these pressures is thus communicated, and added to the expansive force exerted directly on the upper central head 21ᵃ by the fluid which fills the central compartment (within the inner corrugated wall 14ᵃ) and by the initially stressed compression spring 26ᵃ. When this resilient assembly is interposed between the opposing ends of the members 10ᵃ and 11ᵃ and is compressed, by the telescopic approach movement of the said members, the coil spring 26ᵃ is shortened, and increasingly flexed, by the full amount of such movement; but the change in the length of each one of the series connected corrugated walls, 14ᵃ, 14ᵃᵃ and 19ᵃ, is only one-third of the total compression. In order to positively control and limit the balanced fluid pressure action on the three longitudinally flexible members last mentioned (and prevent any one of them from assuming more than its proper share of an extreme closing movement), the rings 16ᵃ, 16ᵃᵃ and the end plates 18ᵃ, 18ᵃᵃ, are so shaped and positioned—with reference respectively to the cap of the casing support 11ᵃ and the lower head 13ᵃ—that, at the point of maximum compression, the rings 16ᵃ, 16ᵃᵃ will have been, concurrently or successively, engaged with the casing cap, and the said plates 18ᵃ, 18ᵃᵃ will have been correspondingly brought into contact with each other and with the central flange of the said head 13ᵃ;—as shown in the sectioned portions of Fig. 8.

It will also be noted that the perforations in the members 18ᵃ, 18ᵃᵃ, are so arranged as to leave a free communication between the successive annular compartments of the fluid containing chamber even when the parts are in the contacting positions of maximum compression last described; and the equalizing flow of liquid—(which fills the lower portions of these compartments, or may in some cases completely fill the outer two compartments)—past these relatively movable end plates will, therefore, never be interrupted. But these equalizing openings may, if desired, be made of such restricted size as to offer an appreciable resistance to the flow of liquid through the moving parts; and the oscillations of the fluid pressure spring may thus be hydraulically damped. The return or recoil of the compressed resilient elements—from the abnormally flexed condition illustrated in Fig. 8 to the position of normal load, or static equilibrium shown in Figs. 5 and 7—may also be retarded to an additional degree by providing the top of the member 11ᵃ with an outwardly opening valve 45ᵃ which will permit the air to pass out of the space above the rings 16ᵃ, 16ᵃᵃ on the compression stroke; but which will prevent the reentry of air to this space on the expansion stroke. The return or recoil movement of the contracted parts (from a position of compression such as shown in Fig. 8) will therefore produce a reduction in pressure, or a partial vacuum, in the expanding space below the cap of the support 11ᵃ; and the pneumatic restraint thus imposed on the expansion movement will progressively increase as the movement continues, until the restoration of the parts to normal load position (Fig. 7) uncovers the end of a passage 46ª that permits air to once more pass from a point outside the valve 45ª to the said space. The pneumatic damping action last described may be further supplemented, in some cases, by providing the lower end of the hollow cup 49ª with a vent that is closed by an outwardly opening flap valve 47ª. In such cases the movement of the cap bolt 50ª toward the head 27ª will force the fluid in the hollow cap past the valve 47ª; but on the reverse or expansion movement the said valve closes and a partial vacuum suction pressure is exerted on the relatively separating parts, 50ª—21ª and 27ª—49ª.

The opening above the valve 45ª may communicate directly with the external atmosphere; but I prefer to utilize the air expelled through this valve, on each compression stroke, to blow out the dust from the lower end of the plunger bearing. In order to accomplish this object I provide a lateral duct 61 which leads from the closed pocket containing the valve 45ª to the top of a vertical passage way 62 in the side wall of the member 11ª. The lower end of the passage 62 is in registery with a grooved opening 63 between the engaged faces of this member and its bracket support 56; and this opening communicates at its bottom with the top of the annular recess into which the casing sleeve 36ª is threaded. Each upward movement of the plunger forces a certain amount of air through the passage ways 61—62—63 into the space above the sleeve 36ª, and thence downwardly and outwardly past the dust packing ring and the guide bearing surfaces at the bottom of the plunger barrel. In order to replace the fluid thus expelled on each compression stroke I provide an inwardly opening valve 64 at the top of the passage way 62 (or at any other convenient point) which will admit a corresponding quantity of atmospheric air on each subsequent expansion stroke.

The operating parts of the supplemental spring construction last described can be easily disassembled by removing the link connection 53 and the lock nut 23ª; after which the plunger 10ª, and the spring cell supported therein, can be withdrawn from its guide support 11ª, and the cell element detached therefrom, as a unit, by removing the nuts on the stud bolts 58, 58. Repairs and replacements can be made very quickly and easily by keeping in stock a number of supplemental spring units that have been inflated to various load carrying capacities for varying conditions of service; and the supplemental lever-stop suspension mechanism may also be readily adjusted, to maintain the operating parts in the proper position for different static loads, by varying the length of the flexible strap connections 42ª—(as by the use of eccentric cross bolt and collar supports at the ends thereof)—and by altering the angular relationship of the lever and link arms 5ª—53, either by using an eccentric bolt and collar at the pintle connection 54 (such as is shown either in Fig. 2 or Fig. 12), or by using an adjustable screw stop 65. If the plunger tube bearing becomes unduly loose after very extended service the casing sleeve 36ª—and if necessary the straight plunger tube 10ª—can be replaced at very small expense.

Figs. 9, 10 and 11 depict a third embodiment of my invention. In this exemplification of my improved suspension system the lever element 5ᵇ is pivotally attached, at its outer extremity, to the lower head 15ᵇ of the elastically supported plunger tube 10ᵇ; and is also coupled to the adjacent eye end of the main spring 1 by means of the U shaped shackle link 7ᵇ. This lever is rockably mounted, near its center, on the axle bracket 6ᵇ; and is provided at its inner end with an adjustable stop 9ᵇ that is normally so set as to make contact engagement with the adjacent portion of the main spring 1 when the parts of the suspension system are in the position of static equilibrium. Under such conditions of adjustment the lever-stop-suspension elements 5ᵇ—6ᵇ—7ᵇ and 9ᵇ act in the same manner as the correspondingly designated parts of the first described organization, in permitting an unrestrained increased flexure of the primary spring support when the system is subjected to kinetic compression stresses, and in preventing any recoil or reflexing of this elastic member beyond its normal load form when the system rebounds or expands from the position of static equilibrium. In this case the plunger tube 10ᵇ is always connected to the end of the lever 5ᵇ, and therefore moves with the said lever and the main spring, both on compression and on rebound movements. The supplemental or secondary spring member, which serves to elastically support and control the reciprocating plunger, is therefore, preferably, of such character as will enable it to resist displacements of this element in either direction from normal load position.

Figs. 10 and 11 illustrate one form of a counteracting-secondary-spring construction which is suitable for use in conjunction with the mounting shown in Fig. 9. In this form of structure, the lower head 13ᵇ of the combination is slidably mounted in the plunger tube 10ᵇ and normally rests on the lower head 15ᵇ thereof. The upper head 21ᵇ is clamped against the cap of the plunger guide support 11ᵇ by means of the lock nut 23ᵇ; and is provided with a long hollow sleeve 50ᵇ which terminates in an inwardly turned collar 51ᵇ that is adapted to engage with the adjacent flanged end 49ᵇ, of the central extension 27$^b$ on the lower head 13$^b$, and thereby limit the separation or expansion of the two heads. The extension 27$^b$ is provided with a hollow piston 66 that fits closely in the bore of the sleeve 50$^b$ and is closed at its upper end by a dished cap 67. The member 27$^b$ is also bored to receive a rod 68 that is secured at its lower end to the plunger head 15$^b$—by means of the threaded pivot bolt cap 15$^c$ and the cap bolts 69—and is provided at its upper end with a head 70 that slides in the hollow piston 66. A strong compression spring 71 is confined at considerable initial tension between the head 70 and the flanged end 49$^b$ of the member 27$^b$. The rod 68 has a central passage way 72, which communicates, at its lower end, with a transverse opening 73 in the block 15$^c$, and which is provided with a series of lateral ports 74, of continually increasing size, that are preferably spaced at substantially equal distances along the line of bearing engagement between the said rod and the extension member 27$^b$.

The heads 13$^b$ and 21$^b$ are connected to the opposite ends of a fluid pressure cell, which is similar in construction to the one shown in Figs. 7 and 8, but which comprises, in this case four, concentric longitudinally flexible metal bellows, 14$^b$, 14$^{bb}$, 19$^{bb}$, and 19$^b$, that are operatively connected to act in series by means of the intervening longitudinally rigid sleeves 17$^b$, 17$^{bb}$ and 17$^c$. The upper ends of the successive pairs of flexible tube and rigid sleeve elements 17$^b$—14$^{bb}$, 17$^{bb}$—19$^{bb}$, and 17$^c$—19$^b$, are secured together by the annular rings 16$^b$, 16$^{bb}$ and 16$^c$ which are in sliding engagement with each other and with the upper head 21$^b$ and the outer support 11$^b$. The lower ends of the successive pairs of concentric elements, 14$^b$—17$^b$, 14$^{bb}$—17$^{bb}$, and 19$^{bb}$—17$^c$, are correspondingly connected by the annular perforated end plates 18$^b$, 18$^{bb}$ and 18$^c$, all of which slide on the central stem 27$^b$, and are respectively limited in their upward motion thereon by the successive shoulders 59$^b$, 59$^{bb}$ and 60$^b$. The space enclosed between the lower head members 13$^b$—27$^b$, the successive pairs of flexible and rigid elements 19$^b$—17$^c$, 19$^{bb}$—17$^{bb}$, 14$^{bb}$—17$^b$ and 14$^b$—50$^b$, the upper head 21$^b$, and the hollow piston 66—67, constitutes a five compartment chamber, which can be filled or discharged either through the opening that is normally closed and sealed by the cap screw 28$^b$, or through the valve controlled passageway, 31$^b$, in the upper head. The four outer compartments are always in communication with each other through the perforations in the end plates 18$^b$, 18$^{bb}$ and 18$^c$, which are so arranged as to remain open even when these plates have been brought into surface contact with each other by the extreme compression of the fluid spring elements; and the inner compartment 26$^b$ is normally in communication with the others through the row of equalizing ports 75 in the sleeve 50$^b$. The space above the movable end rings, 16$^b$, 16$^{bb}$ and 16$^c$, of the spring cell is normally in open communication with the exterior of the casing, through the passage way 61$^b$ the annular recess in the upper face of the head 21$^b$ and the duct 46$^b$ leading from the said recess to the outer periphery of the said head; and when the inner end of this duct is closed—by the relative upward movement of the ring 16$^b$ on the compression movement—the air in that space can still escape (but cannot enter) past the flexible wiper ring valve 45$^b$ on the outer bearing periphery of the collar 16$^c$.

The operation of the above described supplemental spring structure is as follows: When the axle-main spring members, and the body members are forced toward each other—from the normal load position N of Figs. 9 and 10 toward the dotted line positions C of Fig. 9—the plunger members 15$^c$—15$^b$—10$^b$ are moved upward with respect to the support 11$^b$; and the volumetric capacity of the fluid charged supplemental spring chamber is reduced by the corresponding approach of the head members 13$^b$—27$^b$—66—67 and 21$^b$—50$^b$. The mechanically controlled movement of the two parts 50$^b$ and 66—67 immediately closes the equalizing ports 75; and the increased compression of the trapped gas in the inner compartment 26$^b$ is thereafter independent of, and acts in parallel with, the concurrent compression of the gaseous portion of the fluid in the continuously connected outer compartments that are simultaneously, or semi-successively, reduced in volume by the conjoint pressure balanced movements of the flexibly united cell ends 21$^b$—18$^b$, 16$^b$—18$^{bb}$, 16$^{bb}$—18$^c$ and 16$^c$—13$^b$. By properly proportioning the clearance space between the dished cap 67 and the recessed end of the head 21$^b$—as compared with the remainder of the gas filled space in the fluid containing chamber—the increased carrying capacity that results from the maximum compression of the gas or air in the compartment 26$^b$ may be made to equal, or even exceed, the parallel effect that is obtained by the separate compression of the gaseous fluid in the outer compartments. The compressed elastic fluid that is trapped in the space above the cap 67—by the closure of the equalizing ports 75—therefore performs the function of the initially tensioned coil springs 26 and 26$^a$ (used in the first two described exemplifications of my invention); and may, like those coiled elements, be utilized to carry any desired proportion of the increased stress that is imposed on the secondary elastic support by the kinetic compression of the suspension system. This auxiliary action of the rigid plunger actuated pneumatic spring 26$^b$, therefore serves to diminish the pressure strains to which the flexible wall elements (14$^b$ to 19$^b$) would otherwise be subjected. The maximum strains that can be imposed on these flexible metal walls are also limited by so shaping and so spacing the end rings 16$^b$, 16$^{bb}$ and 16$^c$—with reference to the cap of the casing 11$^b$ (or so positioning the corresponding and coactuated end plates 18$^b$, 18$^{bb}$ or 18$^c$ with respect to the lower head 13$^b$) that no one of the corrugated tubes, 14$^b$, 14$^{bb}$, 19$^{bb}$ or 19$^b$, can be compressively shortened to a greater maximum degree than one-fourth of the extreme closing movement of the parts 10$^b$—13$^b$ toward 11$^b$—21$^b$; and any excessive distortion that might otherwise be imposed on any one wall (by reason of the greater flexibility or longitudinal elasticity of the corrugated metal folds thereof) is thus prevented.

The approach of the end rings 16$^b$, 16$^{bb}$ and 16$^c$ toward the cap of the support 11$^b$ expels the air from the space between these parts—through the downwardly opening wiper ring valve 45$^b$—and when the compression movement is arrested, the recoil or return of the abnormally flexed spring elements is pneumatically damped or retarded by the formation of a partial vacuum, or of a progressively reduced pressure, in the top of the guide member. When the normal load position is reached the collar 51$^b$ engages with the flange 49$^b$ and thus positively arrests the recoil or expansion movement of the supplemental spring; but the continued rebound or expansion of the suspension system as a whole carries the lever actuated plunger parts, 10$^b$—15$^c$—15$^b$—68 and 70 downward, or away from the expanded, and now interlocked, casing supported members 21$^b$—50$^b$—27$^b$—13$^b$; thus imposing an increased compression on the initially tensioned coil spring 71, and also creating a partial vacuum, or a progressively reduced pressure, in the expanding space between the heads 13$^b$ and 15$^b$. These concurrent actions impose a continually increased restraint on the separation of the body and the now interlocked main spring-lever-axle elements (1—5$^b$—6$^b$—7$^b$—9$^b$ etc.), that effectively supplements the action of gravity in resisting and checking the rebound or "tossing" of the tonneau as a sequence of an abnormal compressive movement of the suspension springs. The rebound restraint exerted by the spring 71 is rapidly increased by the progressive closing of its coils; and when these are brought into contact with each other the further expansion movement of the members 10$^b$—11$^b$ etc. is substantially arrested. But the pneumatic component of the rebound restraint may be maintained constant—or even diminished as the rebound movement continues—by the progressive uncovering of the ports 74 as the rod 68 is drawn out of the head 13$^b$—27$^b$, and air is admitted in restricted amount to the expanding chamber below the said head. This restricted inflow of air into the expansion space results in a corresponding positive increase in pressure (above normal atmospheric value) when the expanded parts are restored to normal load position; and the recoil of the supernormally flexed rebound restraint spring 71 is thereby damped and cushioned on the return movement.

The air that is compressed in the bottom of the plunger chamber will gradually leak past the grooved sliding joint between the head 13$^b$ and the bore of the plunger tube 10$^b$ into the space between the said tube and the outer flexible wall 19$^b$, and will be mixed with the air which is forced into this same space past the wiper ring valve 45$^b$ on the reciprocating collar 16$^c$. On each compression stroke a part of the air that is thus accumulated in this outer chamber is forced past the slightly enlarged, and longitudinally grooved, head of the plunger tube 10$^b$ into the annular clearance space 63$^b$ below that head; and on the next expansion stroke some of this air is, in turn, blown out of the lower bearing between the plunger tube and the renewable casing sleeve 36$^b$, and thus assists in keeping that bearing free of dust and grit. When the guide bearing surfaces have become unduly loose, after long continued service, the bushing 36$^b$, and if necessary the plunger tube 10$^b$, can be renewed at very small expense. And if the walls or any of the sealed end joints of the hermetrically closed fluid pressure chamber should be accidentally injured or ruptured, the spring cell can also be removed as a unit—(and another fully assembled and charged cell quickly substituted therefor)—by detaching the lever 5$^b$ from its pivotal connections with the axle bracket 6$^b$ and the plunger cap 15$^c$, removing the lock nut 23$^b$ and the bushing 36$^b$, and withdrawing the plunger, with its attached parts from the support 11$^b$; after which the spring cell assembly is readily separated from the plunger members by taking out the cap bolts 69 and unscrewing the cap 15$^c$ from the end of the rod 68.

The various forms of volumetrically elastic containers which are illustrated in Figs. 2, 3 and 4, Figs. 7 and 8, and Figs. 10 and 11, respectively, all present the same basic features of structure: viz, relatively rigid end walls or heads which are united by a plurality of longitudinally flexible or elastic side walls, that are "nested", or concentrically arranged, one within the other, and are hermetically connected in series by intervening longitudinally rigid sleeves. The fluid container is thus divided into a number of compartments which may be entirely separated from each other (as in the first described construction), or may be in continuous communication at all times (as in the second exemplary construction), or may be in part in continuous communication and in part intermittently isolated from one another (as in the case of the five compartment construction last described). The diameters of the successive series-coupled flexible walls or corrugated tubes, and of the alternate rigid connecting sleeves may have any desired ratio; but are preferably so chosen that the effective pressure supporting areas of the relatively movable end connections between the said walls and sleeves are substantially, or approximately, equal to each other; and the several corrugated tube or bellows elements are preferably made of substantially the same length and of such form and material as to have substantially the same internal elastic resistance to deformation. Under such circumstances the total external load stress on the opposing heads of the fluid container will be evenly distributed between the various relatively yielding, but elastically resistant, parts of the complete spring assembly; and the compressive or expansive movements of the hermetically sealed vessel will be provided for, and taken up, by the aggregate, or combined flexures of the several series-connected flexible tubes which act in substantially the same manner as they would if placed end to end to form one unbroken or continuous wall member. It is thus possible to provide for a relatively large compressive movement of the spring heads—which are operatively attached to, or actuated by, the body and axle-main spring members of the vehicle—with a relatively small overall length or height of the fluid pressure spring element, without imposing any sensible, or detrimental, bending or distortion on the individual folds or corrugations of the flexible side walls thereof. I can thus obtain a very short and compact "air spring" cell which is at all times hermetically sealed, but which is capable of large changes in volumetric capacity and of very long continued vibratory action—under all conditions of pressure and temperature—without any undue fatigue, or crystallization, or ultimate rupture of the elastic metal parts of the structure.

The fluid pressure cells, which are used in the several hereinbefore described exemplifications of my invention as exemplary forms of supplemental spring elements, may be filled with gas alone; or in part with liquid and in part with gas; or, in some cases, with suitable liquid-vapor mixtures of low boiling point, such as sulphur dioxide, chlorine, cyanogen, ammonia, carbonic anhydride, etc. The hermetic sealing of the charged cell, and the elimination of all necessity for constant flooding, and continuous lubrication, of internal pump and packing joints, etc. (such as are necessary in other existent forms of air spring construction), makes it possible for me to make use of a wide variety of liquids, gases and vapors for this purpose; and thereby avoid many of the difficulties that accompany the employment of heavy oils, or other highly viscous liquids, in conjunction with compressed air or other oxidizing gases, in the compression space. The permanently charged and sealed chamber of my improved fluid pressure spring elements may, for example, be partially filled with kerosene or gasoline—for the purpose of reducing the elastic fluid volume and increasing the compression ratio for a given closing movement—and the remainder of the space charged, to the requisite load sustaining pressure, with substantially pure nitrogen or carbonic acid, or other inert or neutral gas. In the use of such forms of multiple connected compartment cells as are illustrated, for example, in Figs. 7, 8, 10 or 11, the filling may be conducted in such manner that each charged compartment contains a predetermined volume of trapped and compressed gas, or in such manner that certain compartments are completely filled with liquid alone; and in either case the great mobility of such "fillers" as have just been mentioned, permits of the rapid flow of fluid through the equalizing passages between the different compartments (as the cell is compressed or expanded) without any sensible hydraulic damping of the movement, and without producing an emulsification or "foaming" of the liquid charge. The elimination of all tightly fitted high pressure sliding joints also diminishes the frictional resistance to spring action, and completely avoids the sticking and "freezing" which result from the great increase in static friction that accompanies and follows an extended period of inactivity. The effect of all these contributing factors is to substantially augment the sensitiveness and reliability of operation of the elastic fluid suspension elements, and to attain, to the full degree, the adjustability, the free movement, and the wide range of action, which is characteristic of the "air spring" as compared with other forms of solid metal springs of equivalent carrying capacity and of equal resistance to kinetic displacements.

A further advantage of the hermetically sealed multiple wall type of flexible container, which has been illustrated herein as a part of my present invention, is that this form of fluid pressure spring support may be used in any position; i. e., with its axis of compression either vertical (as shown in the preceding illustrations) or horizontal, or inclined at any desired angle to the body frame of the vehicle. This makes it possible to utilize this improved type of "packless" air spring in certain positions and in certain places—as on the rear side-leaf spring suspensions of heavy truck frames—where it is impossible to install the ordinary liquid seated form of air cell in a vertical position because of lack of head room or because of interference with the platform space. For these reasons this special feature of my improvements (viz, the hermetically closed or "packless" fluid pressure spring support) has a wide range of application to a great variety of elastic suspension organizations for different chassis frame constructions. It is not however necessary to employ any particular form of resilient support elements in order to obtain the functional control that is characteristic of my improved lever-stop suspension mechanism for connecting and coactuating these elements; and in its broader aspects my invention is not, for that reason, limited to the use of pneumatic or fluid pressure springs as the supplemental or secondary members of the suspension system.

It will now be apparent, to those skilled in this art, that all of the above described organizations—which have been presented as exemplary or illustrative embodiments of my present improvements—possess certain common characteristcs of construction and operation, and have certain structural and functional advantages, that serve to broadly distinguish this improved type of elastic suspension gear from other previously known supplemental spring suspension systems. With the previous disclosure as a guide these various distinguishing features of my invention will be readily appreciated by engineers and others who are familiar with existent forms of vehicle spring supports; and they will be enabled to utilize these features—in whole or in part as may be desired—in the production of any additional forms of structure that may be particularly adapted to various modifications of chassis frame construction. I do not therefore wish to limit the scope of application of my invention to the several exemplifications thereof which I have specifically described; and I claim:

1. In a shock absorber organization for two relatively movable members, the combination of a main spring, means for preventing the reflexing or negative flexure of the said spring beyond the form imposed thereon by the normal load stress, and an elastic connection interposed between said main spring and one of the said members.

2. In an elastic support system for two relatively movable members, the combination of a main spring rigidly secured to one of said members, means for positively limiting the reflexing or recoiling of this spring when it is relieved of a portion of the normal load stress, and other means for elastically connecting said spring with the other of said movable members.

3. In a shock absorber system for two relatively movable members, the combination of a main leaf spring rigidly secured to one of the said members, a supplemental suspension spring interposed between the main spring and the other of said members, and means for preventing the reflexing or negative bending of the said main spring when the said members are separated beyond the normal position of static equilibrium.

4. In an elastic support system for vehicles the combination of a primary spring, a secondary spring arranged in series therewith, a lever suspension member conjoining said primary and secondary springs, and means for limiting the angular movement of said lever member and thereby preventing the reflexing or reverse flexure of the primary spring when the normal or static load stress thereon is diminished.

5. An elastic suspension gear for vehicles which comprises a main leaf spring rigidly secured to one of the vehicle members, a lever pivotally mounted on the same member and flexibly coupled to the said main spring, a stop for limiting the angular movement of said lever with respect to said spring and said member and thereby preventing the reflexing of the latter beyond the form which it assumes under normal load, and a secondary spring interposed between the lever and another relatively movable vehicle member.

6. An elastic suspension system for two relatively movable chassis members which comprises a primary spring element rigidly mounted on one of said members, means for limiting the reflexing or negative flexure of said primary spring on its mounting, a secondary spring element mounted on the other of said members, and means for conjoining said primary spring and said secondary spring whereby the latter is adapted to elastically resist the movement of said chassis members in either direction from normal load position.

7. In a shock absorber organization for vehicles the combination of a main spring rigidly mounted on one of the relatively movable chassis members, a lever-stop mechanism carried by this same member and adapted to limit the flexural movement of the main spring with respect thereto, a supplemental spring carried by the other relatively movable chassis member, and means for connecting the supplemental spring with said main spring, whereby any displacement of the latter from normal or static load position is elastically resisted by said supplemental spring.

8. In an elastic suspension for vehicles, the combination of a main spring rigidly mounted on one of the relatively movable vehicle members, a substantially rigid lever pivotally connected with the said spring at two points in the length thereof and a stop for limiting the flexural movement of the spring intermediate of its flexible connections with the said lever.

9. An elastic suspension system comprising a main leaf spring member, a rigid lever member pivotally connected therewith at one point and flexibly coupled thereto at another point in its length, a stop for limiting the angular movement of the lever on its pivotal mounting and thereby limiting the reflexing of the said leaf spring when the load stress thereon is diminished, and an elastic support for the free end of the said lever.

10. In an elastic suspension system for vehicles the combination of a main spring supported on one of the relatively movable chassis members, a supplemental spring mounted on the other of said members, means conjoining the main spring and the supplemental spring whereby an increased flexure is imposed on the latter by any displacement of the said members from normal load position, and other means conjoining the main spring with its chassis support whereby the said main spring is prevented from reflexing when the normal load stress thereon is diminished by rebound or separation of the chassis members beyond said normal position.

11. A spring suspension member which comprises a volumetrically elastic fluid container having a plurality of radially spaced longitudinally flexible side walls, and means for permanently sealing said container after it has been charged with a predetermined quantity of fluid.

12. A spring suspension element which comprises a longitudinally expansible vessel having a plurality of radially spaced flexible side walls permanently connected in series with each other, and means for limiting the expansion of said vessel when it is charged to a predetermined fluid pressure.

13. A fluid spring support which comprises a volumetrically variable container having a plurality of flexible radially spaced and series-connected side wall elements of much greater aggregate length than the container itself, and means for limiting the longitudinal or endwise movement of each of the said flexible walls.

14. In a spring suspension member the combination of a volumetrically elastic metal vessel provided with a plurality of series-connected flexible side walls radially spaced to form annular compartments, means for limiting the longitudinal expansion of said vessel when it is charged with fluid to a predetermined pressure, and means for hermetically sealing the said vessel after it has been so charged.

15. In a spring suspension member the combination of a volumetrically elastic container provided with a plurality of flexible radially spaced and series-connected side wall elements, and with relatively rigid end walls, means for limiting the separation of said end walls when the vessel is charged with fluid to a predetermined load carrying capacity, and means for hermetically sealing said vessel after such charging.

16. A volumetrically elastic vessel comprising a plurality of radially disposed and longitudinally flexible wall elements, a longitudinally rigid tube interposed between successive wall elements, and means for hermetically connecting the opposite ends of said tube to the adjacent ends of said successive radially separated flexible walls whereby the latter are constrained to act in series relation when the vessel expands and contracts.

17. In a fluid pressure spring support for two relatively movable members the combination of a volumetrically elastic container having side walls of radially corrugated material, means for supporting the said container on one of the said members, other means for operatively connecting said container with the other of said members whereby the container and its fluid contents will be volumetrically compressed when the said members move toward each other, and means for preventing a reverse expansion movement of the container when the members separate beyond normal or static load position.

18. A fluid pressure spring support for two relatively movable parts comprising the combination of a volumetrically variable metal container having a plurality of flexible radially spaced and series-connected side walls and relatively rigid end walls, means for supporting one of the end walls on one of said movable parts, other means for operatively connecting the opposite end walls to the other of said movable parts whereby the flexible series-connected side walls are cooperatively reduced in length and the end walls moved toward each other when the spring supported parts are subjected to increased load, and a plurality of stops for limiting the expansion movement of the flexible side walls when the load stress on the said parts is reduced below the normal value.

19. A fluid pressure spring support for vehicles which comprises the combination of a volumetrically elastic container having corrugated and longitudinally flexible side walls mounted on one of the relatively movable chassis members, a connective mechanism conjoining the said container with the other of said members whereby the container and its fluid contents are volumetrically compressed when the chassis members are moved from normal load position toward each other, and means for pneumatically resisting the rebound or separation of the said members beyond the normal load positions.

20. In a fluid pressure spring suspension for two relatively movable members the combination of a volumetrically variable fluid container supported on one of said members, means conjoining the other of said members with one end of the said container whereby the latter is volumetrically compressed when the said members are forced toward each other, means for damping or retarding the recoil or reflex movement of the compressed container when the members return toward normal or static load position, and means for arresting any further expansion of the fluid pressure spring when said normal load position has been reached.

21. In a fluid spring support the combination of an hermetically sealed pressure chamber having rigid end walls and a plurality of radially spaced flexible side walls connected in series by rigid tubes interposed between the said walls, with means for limiting the relative longitudinal movement of each of the said rigid tubes and other means for limiting the separation or expansion of the end walls of the said chamber.

22. A fluid pressure spring which comprises an hermetically sealed elastic container, a metal spring confined therein and acting to expand said container, and means for limiting the said expansion movement.

23. A fluid pressure spring which comprises a volumetrically elastic vessel having a plurality of flexible side walls connected in series with the opposing ends thereof, and a metal spring confined under an initial tension between the said ends and exerting an expanding pressure thereon.

24. A fluid pressure spring which comprises an hermetically sealed vessel having corrugated metal side walls, and relatively rigid ends, a metal spring interposed between these ends and exerting an expanding pressure thereon, and stops for limiting the separation of the said ends by the expansive action of the spring elements.

25. A fluid pressure spring which comprises a volumetrically variable container having a plurality of flexible radially spaced and series connected side walls hermetically joined to each other and to the opposing ends of the container, a coil spring interposed between these ends, and means for limiting the relative movement thereof in both directions.

26. A vehicle suspension spring which comprises a flexible hermetically sealed vessel partially filled with liquid and changed to a predetermined pressure with an elastic fluid, a metal spring interposed between the relatively movable parts of the said flexible vessel and acting to hold said parts in expanded position, and means for limiting the expansion of the said metal spring.

27. A composite spring member which comprises a volumetrically elastic container having substantially rigid heads and a plurality of radially spaced longitudinally flexible wall elements interposed between said heads and connected in series with each other by rigid tubes interposed between the successive radially spaced walls, a metal spring element also interposed between the said heads, and means for limiting the relative separation thereof.

28. A composite spring member which comprises a hermetically sealed elastic vessel provided with substantially rigid end walls and with longitudinally flexible side walls consisting of a plurality of radially spaced series-connected metal bellows, stops for limiting the relative expansion movements of the said bellows, a metal spring interposed between the said rigid end walls, and stops for confining said metal spring under a predetermined initial tension.

29. A composite spring support for two relatively movable members which comprises a longitudinally flexible container having transversely corrugated side walls the said container being partially filled with liquid and charged to a predetermined pressure with an elastic fluid, a metal spring interposed between the ends of said longitudinally flexible container, stops for limiting the expansion thereof, and means conjoining the said ends with said relatively movable members whereby any displacement of the latter from normal position imposes an increased compressive stress on one of the composite spring elements.

30. An air spring support for vehicle bodies which comprises an hermetically sealed longitudinally flexible container having transversely corrugated side walls the said container being partially filled with a mobile liquid and charged with compressed air to a predetermined load carrying capacity, a metal spring enclosed in the said container and confined at a predetermined initial tension between its ends, means for limiting the expansive movements of the charged flexible container, means for attaching said container to one member of the vehicle chassis and other means conjoining said container with another relatively movable member thereof whereby any displacement of the said members from normal load position will subject one of the elastic elements of the spring to increased compression.

31. In a composite spring suspension for two relatively movable members, a vessel having longitudinally flexible side walls and relatively rigid end walls, means for charging said vessel with an elastic fluid and confining it therein at a predetermined initial pressure, a metal spring interposed between the rigid end walls, stops for limiting the expansion or separation thereof, means conjoining the said end walls with the relatively movable members whereby any displacement of the latter from normal position will impose an increased compression on one of the composite spring elements, and other means for imposing a pneumatic damping action on the recoil or expansion movement of the abnormally compressed spring elements.

32. In a spring support for vehicle bodies the combination of a hermetically sealed fluid container having rigid ends and longitudinally flexible side walls that comprise a plurality of concentrically arranged metal bellows connected in series by intervening rigid tubes, stops for individually limiting the relative longitudinal movements of the said side wall elements, a metal spring interposed between the rigid ends of the container, stops for limiting the expansion of the said spring, and other means for arresting the compression movements of the entire assembly.

33. A spring suspension element which comprises a volumetrically elastic vessel having a plurality of longitudinally flexible side walls, and means for holding said walls in nested and radially spaced relationship with each other.

34. A fluid pressure spring which comprises a volumetrically variable container having rigid ends and a plurality of longitudinally flexible side walls connected in series with each other, and a plurality of radially engaged guide elements for maintaining said side walls in substantially concentric relationship with the said rigid ends.

35. A fluid pressure spring which comprises a volumetrically variable vessel having substantially rigid end walls and a plurality of longitudinally flexible metal side walls disposed in radially spaced relationship and connected in series by intervening metal tubes, and means for maintaining the assembled parts in said radial relationship during the expansive and contractive movements of the flexible side walls.

36. In a fluid pressure container the combination of rigid head elements, a plurality of radially disposed and flexible side wall elements interposed between said heads and hermetically connected in series with each other by intervening rigid tubes, and a plurality of radially engaged guides for maintaining said side wall elements against lateral displacement.

37. In a spring suspension system for vehicles the combination of a main spring, a supplemental spring, means for simultaneously imposing an increased flexural strain on both of said springs when the system is subjected to increased compression stress and other means for independently arresting the reflex or expansion movement of each spring when it has returned to normal load form.

38. In an elastic suspension system for vehicle bodies the combination of a main spring, a supplemental spring, a lever conjoining said springs whereby the latter are subjected to an increased flexure when the load stress thereon is abnormally increased, means for damping or retarding the recoil or expansion of the abnormally flexed springs as the increased load stress is removed, and other means for positively arresting the reflex or expansion movement of both springs beyond their normal load form.

39. In an elastic suspension system for two relatively movable members the combination of a main spring, a lever flexibly connected with this spring at two different points in its length, a lever stop element adapted to engage said spring at a third point in the length thereof, a supplemental spring, means conjoining said lever with said supplemental spring whereby the latter is adapted to resist any displacement of the said members from normal or static load position, and other means for damping or retarding the recoil or return movement of the parts to the said normal position.

40. In an elastic suspension system, the combination of a main spring, a supplemental spring cooperating in series therewith, a lever mechanism conjoining said springs whereby the latter are concurrently subjected to increased flexure when the system is compressed, means for limiting the reflex or subnormal flexure of both spring when the system expands, and other means for imposing an elastic restraint on the expanding system.

41. An elastic suspension system comprising a main spring, a supplemental spring, means for coupling said springs in operative series relationship whereby they are concurrently flexed when the system is compressed, means for retarding the recoil of the flexed springs when the compressed system returns to its normal position of static equilibrium, means for preventing the reflex movement of the said springs beyond their normally tensioned form, and other means for again subjecting the supplemental spring to increased flexural strain when the system continues to expand beyond its normal position.

42. An elastic suspension system for vehicle bodies which comprises a main spring, a lever flexibly connected therewith at a plurality of points in the length thereof, a stop attached to said lever and adapted to engage said spring at another point in its length, a supplemental spring mounted on the vehicle body, means conjoining said lever with said supplemental spring whereby the latter is subjected to an increased flexural strain when the vehicle body is moved in either direction from its normal or static load position, means for damping the recoil of the abnormally flexed supplemental spring, and other means for positively arresting said recoil movement when the said spring has returned to its normal load form.

43. An elatic suspension system for vehicles which comprises a main leaf spring, a supplemental fluid pressure spring, means for coupling said springs in operative series relationship whereby the leaf spring is increasingly flexed and the fluid pressure spring is compressed when the elastically suspended parts are forced toward each other, means for arresting the reflex movement of the leaf spring when the said parts rebound or separate beyond normal load position, and other means for again subjecting the supplemental spring to increased compression during this rebound movement.

44. In an elastic suspension system for vehicles the combination of a main spring, a supplemental fluid pressure spring, a lever mechanism conjoining said springs in operative series relationship whereby both of the said resilient suspension elements are subjected to a concurrently increased flexure or compression when the body and axle parts are forced toward each other, a stop for locking the main spring in fixed flectural relationship to the lever mechanism when the system rebounds or expands beyond normal load position, and an auxiliary connection between said lever mechanism and one of the relatively movable vehicle members whereby the fluid pressure spring is subjected to increased compression during such rebound or expansion movement.

45. In an elastic suspension system for vehicles the combination of a main leaf spring rigidly supported on one of the relatively movably chassis parts, a supplemental air spring mounted on the other of said parts, means conjoining said main and supplemental springs in operative series relationship whereby both of these elements are positively compressed when the system is subjected to an abnormal load stress, stop members for locking the normally flexible portion of the main spring in fixed relation to its chassis support when the system rebounds or expands beyond normal load position, and an auxiliary one way connection conjoining said interlocked main spring and stop members with the supplemental air spring whereby the later is compressed during the aforesaid rebound movement.

In testimony whereof I have hereunto set my hand.

FRANK L. O. WADSWORTH.